US012567914B2

(12) United States Patent
Pfadler et al.

(10) Patent No.: US 12,567,914 B2
(45) Date of Patent: Mar. 3, 2026

(54) METHODS, COMPUTER PROGRAMS AND APPARATUSES FOR DETERMINING AND USING A PREDICTED FUTURE QUALITY OF SERVICE OF A WIRELESS COMMUNICATION LINK

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 336 days.

(21) Appl. No.: 18/546,276

(22) PCT Filed: Feb. 18, 2022

(86) PCT No.: PCT/EP2022/054060
§ 371 (c)(1),
(2) Date: Aug. 13, 2023

(87) PCT Pub. No.: WO2022/175441
PCT Pub. Date: Aug. 25, 2022

(65) Prior Publication Data
US 2024/0129050 A1     Apr. 18, 2024

(30) Foreign Application Priority Data
Feb. 22, 2021     (EP) ..................................... 21158335

(51) Int. Cl.
| | |
|---|---|
| *H04B 17/373* | (2015.01) |
| *H04W 24/04* | (2009.01) |
| *H04W 64/00* | (2009.01) |

(52) U.S. Cl.
CPC .......... *H04B 17/373* (2015.01); *H04W 24/04* (2013.01); *H04W 64/006* (2013.01)

(58) Field of Classification Search
CPC ... H04B 17/373; H04W 24/04; H04W 64/006
(Continued)

(56) References Cited

U.S. PATENT DOCUMENTS

| | | | |
|---|---|---|---|
| 9,538,439 B2 | 1/2017 | Pica et al. | |
| 11,876,571 B2 * | 1/2024 | Svennebring | ........ H04B 17/373 |
(Continued)

FOREIGN PATENT DOCUMENTS

| | | |
|---|---|---|
| EP | 2995127 A2 | 3/2016 |

OTHER PUBLICATIONS

Fodor et al.; 5G New Radio for Automotive, Rail, and Air Transport; IEEE Communications Magazine; arXiv.org; XP081865001; Jan. 21, 2021; pp. 22-28; vol. 59, No. 7.
(Continued)

*Primary Examiner* — Asad M Nawaz
*Assistant Examiner* — Hugh Mark Ashley
(74) *Attorney, Agent, or Firm* — BARNES & THORNBURG LLP

(57) ABSTRACT

Methods, computer programs, and apparatuses for determining and using a predicted future quality of service of a wireless communication link between a transceiver and a mobile transceiver. The method includes obtaining information on a position and a movement of the mobile transceiver, determining a predicted received power of the wireless communication link at the mobile transceiver based on the mobile transceiver position, determining a predicted mismatch between an ideal time-frequency-grid configuration
(Continued)

and a time-frequency-grid configuration used for the wireless communication link based on the position and movement of the mobile transceiver, determining a predicted throughput of the wireless communication link based on the predicted received power and based on the predicted mismatch between the ideal time-frequency-grid configuration and the time-frequency-grid configuration used for the wireless communication link, and determining the predicted future quality of service of the wireless communication link based on the predicted throughput of the wireless communication link.

24 Claims, 7 Drawing Sheets

(58) Field of Classification Search
USPC ........................................................ 370/252
See application file for complete search history.

(56) References Cited

U.S. PATENT DOCUMENTS

| | | | |
|---|---|---|---|
| 2011/0273997 A1 | 11/2011 | Sumasu et al. | |
| 2016/0285683 A1 | 9/2016 | Ulrich et al. | |
| 2020/0045559 A1* | 2/2020 | Kim ................. | H04W 28/0268 |
| 2022/0173855 A1* | 6/2022 | Akoum ............... | H04L 25/0222 |
| 2023/0217264 A1* | 7/2023 | Challita .................. | G06N 7/01 |
| | | | 370/329 |

OTHER PUBLICATIONS

Jung et al.; The WSSUS Pulse Design Problem in Multicarrier Transmission; IEEE Transactions on Communications Oct. 2007; pp. 1918-1928; vol. 55, No. 10.
Extended European Search Report; European Patent Application No. 21158335.6; Aug. 20, 2021.
International Search Report; International Patent Application No. PCT/EP2022/054060; Apr. 21, 2022.

* cited by examiner

METHODS, COMPUTER PROGRAMS AND APPARATUSES FOR DETERMINING AND USING A PREDICTED FUTURE QUALITY OF SERVICE OF A WIRELESS COMMUNICATION LINK

PRIORITY CLAIM

This patent application is a U.S. National Phase of International Patent Application No. PCT/EP2022/054060, filed 18 Feb. 2022, which claims priority to European Patent Application No. 21158335.6, filed 22 Feb. 2021, the disclosures of which are incorporated herein by reference in their entireties.

SUMMARY

Illustrative embodiments relate to methods, computer programs and apparatuses for determining and using a predicted future quality of service of a wireless communication link between a base station and a mobile transceiver.

BRIEF DESCRIPTION OF THE DRAWINGS

Disclosed embodiments will be described with reference to the accompanying drawings, in which.

DETAILED DESCRIPTION

Figure 1A:
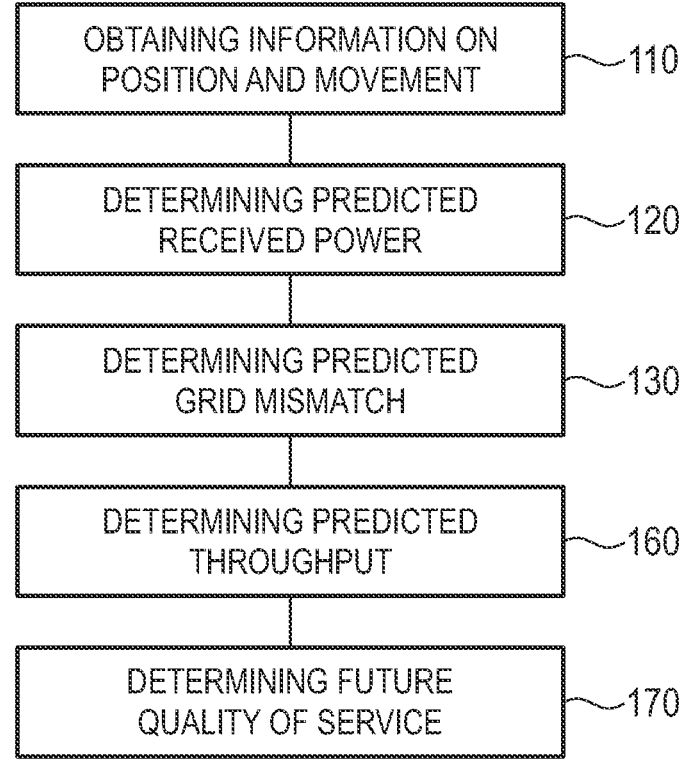
FIGS. 1a and 1b show flow charts of examples of a disclosed method for predicting a future quality of service of a wireless communication link between a transceiver and a mobile transceiver.

Future vehicular communication systems may require high reliability and efficiency under various mobility conditions. On the other hand, communication systems are often irregular in their performance, but the quality of the communication may be predicted.

However, many methods for the prediction of a quality of service (PQoS) are mainly based on radio maps (coverage maps). These methods usually do not take the mobility of the users into account.

European patent EP 2 995 127 B1 relates to a method and apparatus for estimating an achievable link throughput based on assistance information. The patent uses assistance information, such as Channel Quality Indicator (CQI) or a ratio of pilot energy to noise-plus-interference to estimate the available bandwidth. However, the mobility of user equipment (UE) is only taken into account on a very broad level, i.e., with regards to handover procedures occurring when the UE moves between different cells.

US patent application US 2011/0273997 A1 relates to a radio communication system, a scheduling method, a radio base station device and to a radio terminal. US patent application US 2016/0285683 A1 relates to a terminal device and method for radio network scan operation. In the applications, a quality of service is predicted, however, the movement of the radio terminal is not taken into account.

US patent application US 2020/0045559 A1 relates to a method for transmitting and receiving signals related to QoS prediction in a wireless communication system. In the application, the transmission of signals related to the QoS prediction is discussed while details on the factors being used to perform the prediction are omitted.

Fodor et al. "5G New Radio for Automotive, Rail, and Air Transport" discusses the impact of different prediction horizons with respect to 5G new radio, and compares their performance. There may be a desire for providing an improved method for predicting a quality of service of a wireless communication link between a base station and a mobile transceiver.

This desire is addressed by the subject-matter of the independent claims.

Various exemplary embodiments are based on the finding, that a movement of a mobile transceiver, such as a transportation vehicle, can lead to degradation of a performance of a wireless communication link between the mobile transceiver and the base station due to a resulting mismatch between a time-frequency-grid being used for the wireless communication link and an ideal time-frequency-grid that is adapted to the movement of the mobile transceiver. This mismatch may influence a spectral efficiency of the wireless communication link, and thus a throughput that is possible on the wireless communication link. The throughput may in turn be used to predict the quality of service of the wireless communication link, providing a more precise prediction of the quality of service.

Disclosed embodiments provide a method for predicting a future quality of service of a wireless communication link between a transceiver, such as a base station or a mobile transceiver, and a mobile transceiver. The method comprises obtaining information on a position and information on a movement of the mobile transceiver. The method comprises determining, based on the position of the mobile transceiver, a predicted received power of the wireless communication link at the mobile transceiver. The method comprises determining, based on the position and movement of the mobile transceiver, a predicted mismatch between an ideal time-frequency-grid configuration and a time-frequency-grid configuration used for the wireless communication link. The method comprises determining, based on the predicted received power and based on the predicted mismatch between the ideal time-frequency-grid configuration and the time-frequency-grid configuration used for the wireless communication link, a predicted throughput of the wireless communication link. The method comprises determining, based on the predicted throughput of the wireless communication link, the predicted future quality of service of the wireless communication link. By considering the predicted mismatch between the ideal time-frequency-grid configuration and a time-frequency-grid configuration used for the wireless communication link, an accuracy of the throughput prediction for wireless communication links of fast-moving mobile transceivers, such as transportation vehicles, may be increased, leading to an improved method for predicting a quality of service of a wireless communication link between a transceiver and a mobile transceiver.

In general, which grid configuration is optimal for a wireless communication link between a transceiver and a mobile transceiver depends on the movement and radio environment of the mobile transceiver, and, in particular, on the delay-Doppler spread of the wireless communication link. For example, the predicted mismatch between the ideal time-frequency-grid configuration and the time-frequency-grid configuration used for the wireless communication link may be based on a predicted delay-Doppler spread of the wireless communication link.

In particular, a Doppler-component of the predicted delay-Doppler spread may be based on a velocity of the movement of the mobile transceiver. A delay-component of the predicted delay-Doppler spread may be based on the position of the mobile transceiver. Both components may be determined based on the information on the position and movement of the mobile transceiver. For example, at least one of a Doppler-component and a delay-component of the delay-Doppler spread may be determined by retrieving the respective information from a database based on the movement and/or position of the mobile transceiver. For example, a prediction of the Doppler component may be retrieved from the database based on the relative velocity between the transceiver and the mobile transceiver. Additionally or alternatively, a prediction of the delay-Component may be retrieved from the database based on the position of the mobile transceiver.

In some cases, a coverage map may be used to determine the predicted received power, as the received power may be linked to the position of the mobile transceiver on the coverage map. For example, the predicted received power of the wireless communication link at the mobile transceiver may be determined based on a coverage map of a radio environment of the transceiver.

In some examples, one or more further factors may be considered when determining the throughput. For example, the method may comprise determining a predicted interference on the wireless communication link. The predicted throughput of the wireless communication link may be determined further based on the predicted interference on the wireless communication link. Additionally, or alternatively, the method may comprise determining a predicted receiver noise power at the mobile transceiver. The predicted throughput of the wireless communication link may be determined further based on the predicted receiver noise power at the mobile transceiver. Both the predicted interference and the predicted receiver noise power may be considered to increase the accuracy of the prediction of the throughput.

For example, the predicted throughput of the wireless communication link may be determined based on a predicted Signal-to-Interference-and-Noise-Ratio (SINR) based on the predicted received power, based on the predicted mismatch between the ideal time-frequency-grid configuration and the time-frequency-grid configuration used for the wireless communication link, based on a predicted interference on the wireless communication link and based on a predicted receiver noise power at the mobile transceiver. The SINR may be determined based on all or based on a subset of the afore-mentioned factors.

In some cases, the spectral efficiency may be considered, which is, in general, based on the SINR and the modulation/coding scheme being used at the respective SINR. In other words, the predicted throughput of the wireless communication link may be determined based on a modulation scheme that is selected based on the predicted Signal-to-Interference-and-Noise-Ratio.

Another potential factor is the availability of wireless resources at the transceiver, e.g., the availability of wireless resources at a base station, if the transceiver is a base station—the more mobile transceivers communicate with the base station at the same time, the fewer wireless resources may be available for the mobile transceiver. Accordingly, the transceiver may be a base station. The predicted throughput of the wireless communication link may be determined further based on an availability of wireless resources at the base station.

In general, the proposed concept may be used in a multitude of scenarios. For example, the wireless communication link may be based on a multicarrier transmission-based wireless communication system. The wireless communication link may be based on one of an Orthogonal Frequency Division Multiplexing (OFDM)-based wireless communication system, an Orthogonal Time-Frequency-Space (OTFS)-based wireless communication system, and a Filter-Bank Multi Carrier (FBMC)-based wireless communication system. These wireless communication systems are multicarrier transmission-based wireless communication systems. The predicted throughput of the wireless communication link may be determined based on a multicarrier transmission-based wireless communication system being used for the wireless communication link. For example, the multicarrier transmission-based wireless communication system being used for the wireless communication link has consequences regarding the signal shape being used and regarding the modulation/coding being used, which may have an impact on the throughput.

In various examples, the method comprises providing information on the predicted future quality of service of the wireless communication link to the mobile transceiver. For example, the information on the predicted future quality of service of the wireless communication link may be used by the mobile transceiver to adapt the communication over the wireless communication link.

Various exemplary embodiments relate to a computer program having a program code for performing the above method, when the computer program is executed on a computer, a processor, or a programmable hardware component.

Various exemplary embodiments relate to an apparatus comprising one or more interfaces for communicating in a mobile communication system and a control module configured to carry out the above method.

Various exemplary embodiments relate to a method for a mobile transceiver. The method comprises receiving, from a transceiver, such as another mobile transceiver or a base station, information on a future quality of service of a wireless communication link between the mobile transceiver and the mobile transceiver. The information on the future quality of service of the wireless communication link is based on a predicted received power of the wireless communication link at the mobile transceiver and based on a predicted mismatch between an ideal time-frequency-grid configuration and a time-frequency-grid configuration being used for the wireless communication link. For example, the information on the predicted future quality of service of the wireless communication link may be used by the mobile transceiver to adapt the communication over the wireless communication link.

Various exemplary embodiments relate to a computer program having a program code for performing the above method, when the computer program is executed on a computer, a processor, or a programmable hardware component.

Various exemplary embodiments relate to an apparatus comprising one or more interfaces for communicating in a mobile communication system and a control module configured to carry out the above method.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular exemplary embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
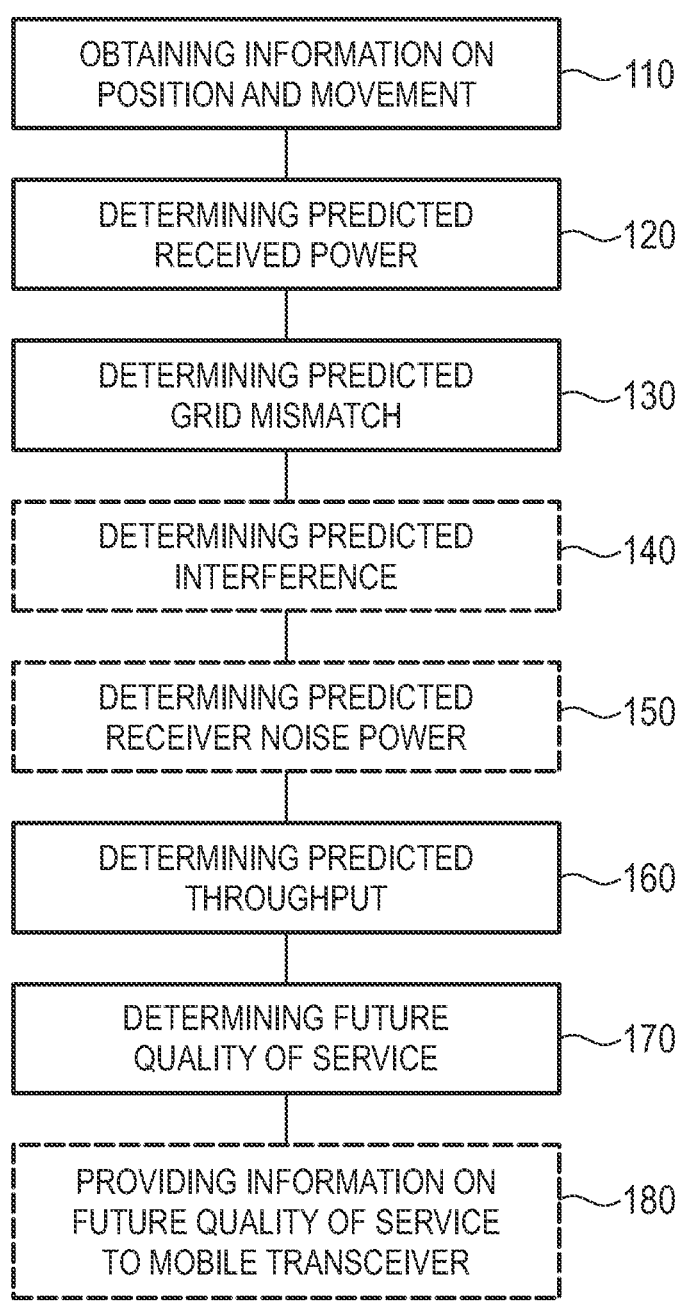
Figure 1C:
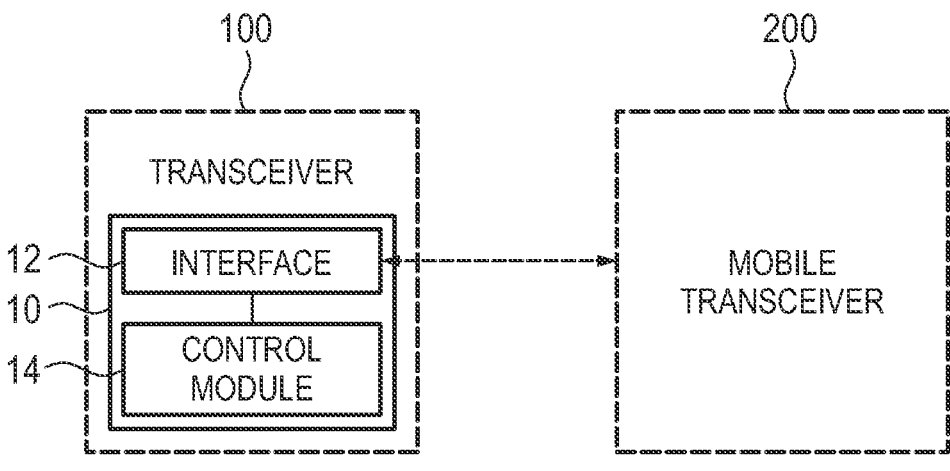
FIG. 1c shows a block diagram of an example of a disclosed apparatus for predicting a future quality of service of a wireless communication link between a transceiver and a mobile transceiver.

FIGS. 1a and 1b show flow charts of examples of a method for predicting a future quality of service of a wireless communication link between a transceiver 100 and a mobile transceiver 200 (shown in FIG. 1c). In the following, the transceiver 100 is described as base station 100. However, the transceiver 100 may alternatively be another mobile transceiver 100. The method comprises obtaining 110 information on a position and information on a movement of the mobile transceiver. The method comprises determining 120, based on the position of the mobile transceiver, a predicted received power of the wireless communication link at the mobile transceiver. The method comprises determining 130, based on the position and movement of the mobile transceiver, a predicted mismatch between an ideal time-frequency-grid configuration and a time-frequency-grid configuration used for the wireless communication link. The method comprises determining 160, based on the predicted received power and based on the predicted mismatch between the ideal time-frequency-grid configuration and the time-frequency-grid configuration used for the wireless communication link, a predicted throughput of the wireless communication link. The method comprises determining 170, based on the predicted throughput of the wireless communication link, the predicted future quality of service of the wireless communication link.

FIG. 1c shows a block diagram of examples of a corresponding apparatus 10 for predicting the future quality of service of a wireless communication link between the transceiver and the mobile transceiver. The apparatus 10 comprises one or more interfaces 12 for communicating in a mobile communication system. The apparatus comprises a control module 14 configured to carry out the method introduced in connection with FIGS. 1a and/or 1b. For example, the one or more interfaces may be used to communicate with the mobile transceiver 100, and the control module may be used to perform calculations. In general, the functionality of the apparatus 10 is provided by the control module 14, in conjunction with the one or more interfaces 12 with regards to communication. The one or more interfaces 12 are coupled with the control module 14. FIG. 1c further shows the transceiver/base station 100 comprising the apparatus 10. FIG. 1c further shows a system comprising the transceiver/base station 100 (with the apparatus 10) and the mobile transceiver 200.

The following description relates to the method of FIGS. 1a and/or 1b, to the corresponding apparatus 10 and base station 100 of FIG. 1c, and to a corresponding computer program. Disclosed embodiments of the present disclosure relate to wireless communication devices, such as a transceiver/base station and a mobile communication device, and to corresponding methods, apparatuses and computer programs. In the following, two wireless communication devices may be assumed that communicate with each other, a base station and a mobile transceiver. This communication is usually performed using wireless transmissions that are exchanged between the two wireless communication devices over a (wireless) channel. In at least some disclosed embodiments, the channel may be assumed to be a doubly-dispersive channel. This communication may be sub-divided into smaller and smaller units. In general, in wireless communication, a frame or data frame is considered to be a coherent unit that comprises or represents a plurality of symbols. For example, a frame may be defined as cyclically repeated data block that comprises (or consists of) one or a plurality of time slots. In these time slots, data may be transmitted via a plurality of different carrier frequencies. For example, in disclosed embodiments each frame comprises a plurality of time slots, which are transmitted via a plurality of carrier frequency. Correspondingly, the data frame may be considered to be transmitted in the time frequency plane, wherein the time slots span across the time dimension of the time-frequency plane, and wherein the carrier frequencies span across the frequency dimension of the time-frequency plane. This time-frequency plane can be used to model a (logical) grid that spans via the time dimension and the frequency dimension. This is a logical construct, which is, during transmission of the data frames, mapped to the time slots and carrier frequencies. In general, this grid in the time-frequency plane is delimited by the bandwidth range being used to transmit the data frame, and by the time that is used to transmit the frame (the time being subdivided into the one or the plurality of time slots). Accordingly, in disclosed embodiments, each data frame is based on a two-dimensional grid in a time-frequency plane having a time dimension resolution and a frequency dimension resolution.

Grids (in the time-frequency plane and in the delay-Doppler plane) may be used to represent the signals. In multicarrier transmission-based wireless communication systems, computationally feasible equalizers may suffer from mismatched time-frequency grids. Parity may be achieved with perfect gird matching of the Gabor synthesis and analysis pulses with the delay and Doppler spread of the channel. However, this might not be achieved in practice due to the varying mobility of users, and correspondingly changing channels. This may lead to performance degradation (higher error rates). In many cases, this may be caused by a mismatch of the grid, as perfect grid matching is assumed in theoretical studies on multicarrier transmission-based wireless communication systems, such as OTFS, OFDM and FBMC. For example, the predicted throughput of the wireless communication link may be determined based on a multicarrier transmission-based wireless communication system being used for the wireless communication link. For example, the wireless communication link may be based on a multicarrier transmission-based wireless communication system. For example, the wireless communication link may be based on one of an OFDM-based wireless communication system, an OTFS-based wireless communication system, and a FBMC-based wireless communication system. Unfortunately, grid mismatch may cause significant performance degradation.

Various exemplary embodiments of the present disclosure are based on the finding that this grid, or rather a grid mismatch, e.g., a performance degradation due to the grid being used being different from an ideal time-frequency grid for the wireless communication link, has a major impact on a throughput of a wireless communication link, and thus also an impact on a predicted future quality of service of the wireless communication link.

To obtain an improved performance, a time resolution and frequency resolution for the grid in the time-frequency plane that matches the channel that is used for the communication between the wireless communication devices may be chosen. Such a time resolution and frequency resolution for the grid in the time-frequency plane that matches the channel that is used for the communication between the wireless communication devices, such as the transceiver/base station and the mobile transceiver, may be denoted an ideal time-frequency-grid configuration for the communication over the wireless communication link. In other words, the ideal time-frequency-grid configuration is one that matches the channel that is used for the communication between the wireless communication devices. For example, in different scenarios, signals transmitted via the channel may experience different amounts of delay spread and Doppler spread. To account for such different channels, the grid may be chosen such that the respective properties of the channel are taken into account. For lower relative velocities, less resolution in the time domain may be required, and a higher resolution in the frequency domain may be desired if higher delays occur. For example, at higher relative velocities, a grid having a higher resolution (i.e., more points) in the time dimension may be beneficial (to allow for a higher Doppler spread), while at lower relative velocities, a grid having a higher resolution (i.e., more points) in the frequency dimension may be beneficial.

In theory, it may be possible to select "the" perfect grid for each communication. In practice however, it may be more useful to limit the number of grid configurations (or communication modes), to reduce an implementation complexity of the wireless communication device. The grid configurations define a combination of a frequency dimension resolution and a time dimension resolution of the two-dimensional grid in the time-frequency plane.

In general, the position and movement of the mobile transceiver may be used to determine the grid mismatch. The method thus comprises obtaining 110, e.g., receiving, information on a position and information on a movement of the mobile transceiver. Such information may be available at the transceiver/base station, e.g., as the transceiver/base station tracks the mobile transceiver for beam-forming and/or handover purposes, or the information on the position and/or the information on the movement of the mobile transceiver may be received from the mobile transceiver. For example, the information on the position of the mobile transceiver may comprise coordinates of the mobile transceiver, or a position of the mobile transceiver on a coverage map surrounding the transceiver/base station. This information may be used to predict a delay-spread of the wireless communication link, and thus an "ideal" configuration of a time-component of the time-frequency-grid. The information on the movement of the mobile transceiver may comprise information on a velocity of the mobile transceiver relative to the transceiver/base station, information on a movement vector of the mobile transceiver, and/or information a past and/or future path of the mobile transceiver. This information may suffice to determine the velocity of the mobile transceiver relative to the transceiver/base station, predict the Doppler spread of the wireless communication link based on the velocity, and thus determine the "ideal" configuration of a frequency component of the time-frequency-grid.

The method comprises determining 130, based on the position and movement of the mobile transceiver, the predicted mismatch between an ideal time-frequency-grid configuration and a time-frequency-grid configuration used for the wireless communication link. In this context, the term "ideal time-frequency-grid configuration" must not be taken literally, as the ideal time-frequency-grid configuration is also time-and-location-variable and thus changes depending on the progress of the mobile transceiver. Instead, the "ideal time-frequency-grid configuration" may be a configuration, among a plurality of pre-defined grid configurations, that most closely matches a predicted delay-Doppler spread of the wireless communication link, e.g., at a given time. In other words, the "ideal time-frequency-grid configuration" might not be considered ideal at any point of the progress of the mobile transceiver, but the best among a plurality of pre-defined grid configurations, with regards to a predicted delay-Doppler-spread of the wireless communication link. For example, the predicted mismatch between the ideal time-frequency-grid configuration and the time-frequency-grid configuration used for the wireless communication link may be based on the predicted delay-Doppler spread of the wireless communication link. As pointed out above, a Doppler-component of the predicted delay-Doppler spread may be based on a velocity of the movement of the mobile transceiver. A delay-component of the predicted delay-Doppler spread may be based on the position of the mobile transceiver. To simplify calculations, the predicted delay-Doppler-spread may be determined based on pre-calculated values for various locations around the transceiver/base station and for various velocities of mobile transceivers. For example, a database may be used to store values regarding a delay-spread and/or Doppler-spread for a given position and/or movement of the mobile transceiver. For example, the values regarding the delay-spread and/or Doppler-spread may be based on, or comprise, second-order statistics of the wireless channel of the transceiver. For example, at least one of a Doppler-component and a delay-component of the delay-Doppler spread may be determined by retrieving the respective information from a database based on the movement and/or position of the mobile transceiver, and/or using a data-driving algorithm, which may be based on machine-learning. For example, a machine-learning model may be trained to output at least one of a Doppler-component and a delay-component of the delay-Doppler spread based on a position and/or movement of the mobile transceiver. For example, the machine-learning model may be trained using historic data on the delay-component and/or Doppler-component and the corresponding position and/or movement as training data. For example, a supervised learning algorithm may be used to train the machine-learning model.

In addition to the predicted grid mismatch, the predicted received power of the wireless communication link is used for the prediction of the throughput. Thus, the method comprises determining 120, based on the position of the mobile transceiver, the predicted received power of the wireless communication link at the mobile transceiver. Again, the predicted received power of the wireless communication link can be obtained from a database, e.g., from a coverage map, based on the position of the mobile transceiver. In other words, the predicted received power of the wireless communication link at the mobile transceiver may be determined based on a coverage map of a radio environment of the transceiver/base station. For example, the database and/or the coverage map may comprise, for the coverage area of the transceiver/base station, pre-calculated values for the predicted received power, which may be obtained based on the position of the mobile transceiver. For example, the transceiver/base station and/or the apparatus 10 for the transceiver/base station may comprise the base station and/or the coverage map.

The method comprises Determining 160, e.g., calculating, based on the predicted received power and based on the predicted mismatch between the ideal time-frequency-grid configuration and the time-frequency-grid configuration used for the wireless communication link, the predicted throughput of the wireless communication link. For example, the predicted received power may be divided by the power of the influence of the mismatch between the ideal time-frequency-grid configuration and the time-frequency-grid configuration used for the wireless communication link. This ratio may subsequently be used to determine a modulation/coding scheme that is feasible under these conditions, which may, in turn, be used to predict the throughput.

There are several other factors that may also be considered when predicting the throughput. For example, the above ratio is a ratio that expresses how well wireless transmissions of the transceiver/base station over the wireless communication link can be received by the mobile transceiver (or vice versa). In addition to the received power and the power loss due to grid mismatch, interference on the wireless communication link and/or noise at the receiver may be considered, e.g., to calculate a Signal-to-Interference-and-Noise-Ratio. Accordingly, the method may comprise determining 140 a predicted interference (e.g., by one or more other mobile transceivers) on the wireless communication link. The method may comprise determining 150 a predicted receiver noise power at the mobile transceiver (which may be based on the bandwidth). Both factors are commonly calculated within mobile communication systems, e.g., channel quality reporting of a mobile transceiver towards the transceiver/base station. Based on these three or four components, the throughput may be predicted. For example, the predicted throughput of the wireless communication link may be determined further based on the predicted interference on the wireless communication link and/or further based on the predicted receiver noise power at the mobile transceiver.

For example, the predicted throughput of the wireless communication link may be determined based on a predicted Signal-to-Interference-and-Noise-Ratio. For example, the SINR may be based on the predicted received power (P), based on the predicted mismatch between the ideal time-frequency-grid configuration and the time-frequency-grid configuration used for the wireless communication link ($P_{grid\ mismatch}$), based on a predicted interference on the wireless communication link ($P_{interference}$) and based on a predicted receiver noise power ($\sigma^2$) at the mobile transceiver. For example, $$SINR = \frac{P}{\sigma^2 + P_{grid\ mismatch} + P_{interference}},$$

or a similar formula, may be used to determine the SINR.

Figure 3A:
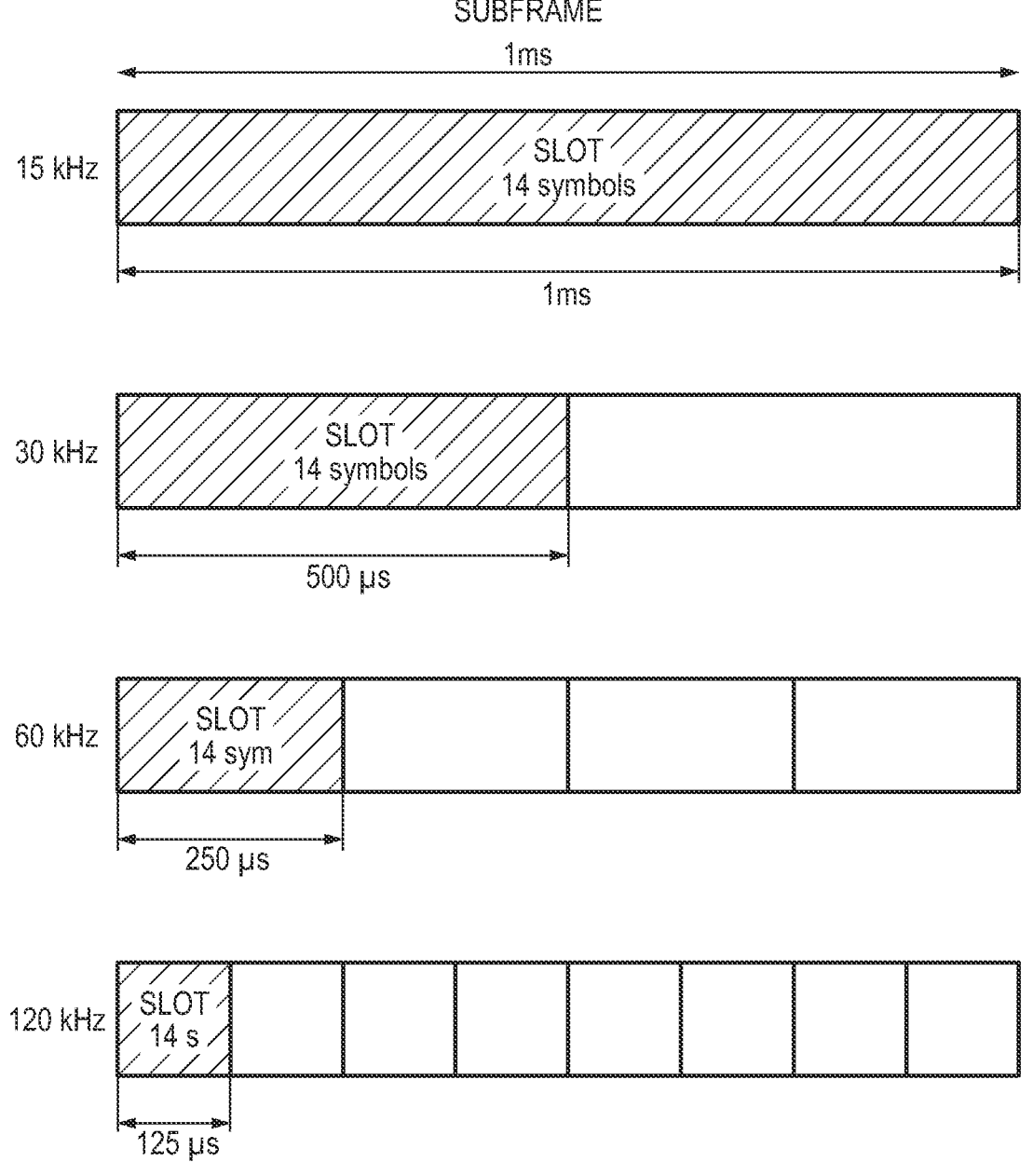
FIG. 3a shows examples of configurations for 5G NR.
Figure 3B:
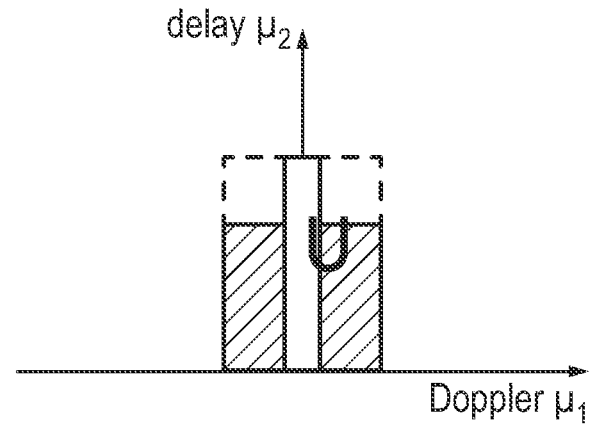
FIG. 3b illustrates multi-carrier Gabor pulse designing rules for communication based the channel delay and Doppler shifts.
Figure 3C:
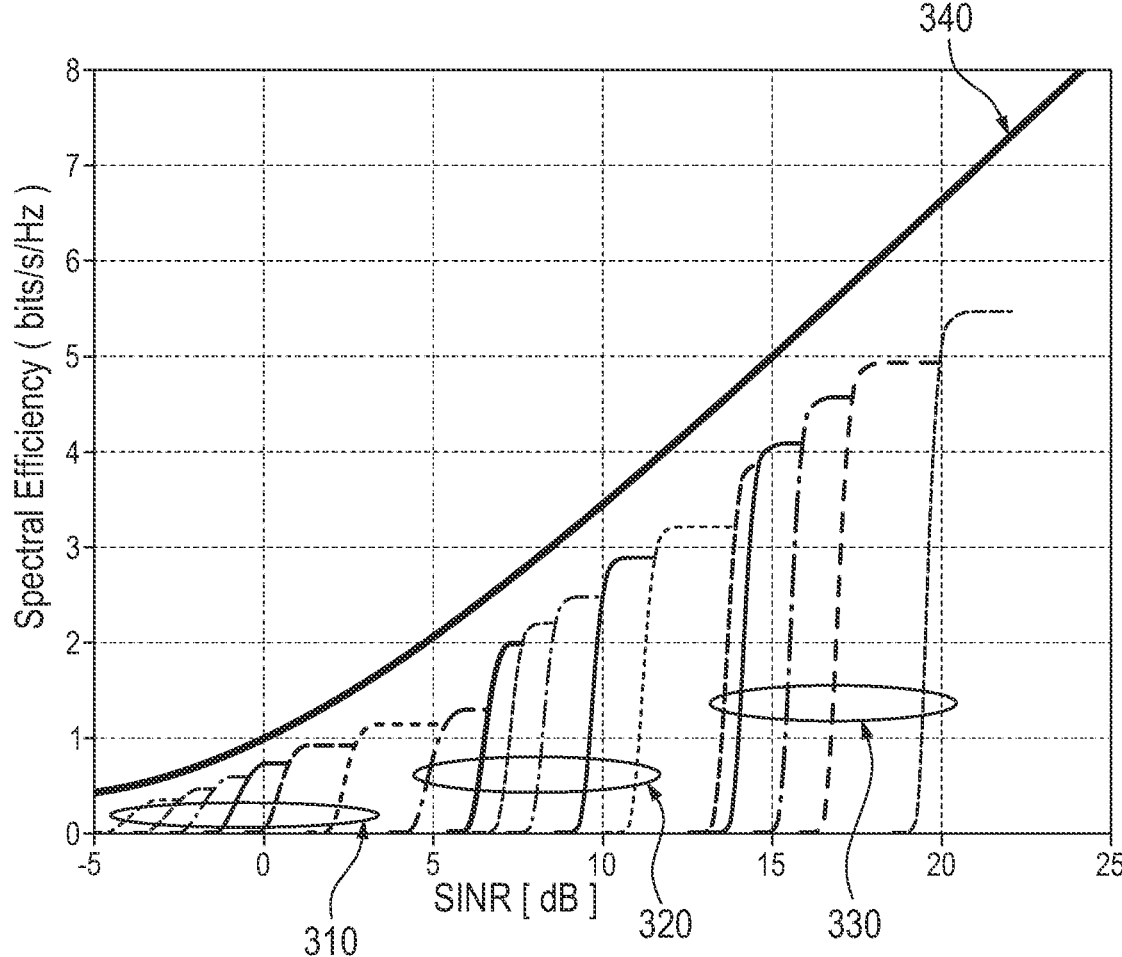
FIG. 3c shows a graph illustrating the spectral efficiency at different SINR.

The predicted throughput may be derived from the SINR. For example, as shown in FIG. 3c, depending on the SINR, different modulation schemes/coding schemes may be used by the transceiver/base station, which define or limit the throughput that can be reached. For example, the throughput may be based on a combination of the modulation scheme being used (e.g., QPSK, 16QAM, 64QAM) and cording rate being used. Furthermore, the throughput may be based on a usage of MIMO (Multiple Input, Multiple Output). For example, the predicted throughput of the wireless communication link may be determined based on a modulation scheme (and coding rate) that is selected based on the predicted Signal-to-Interference-and-Noise-Ratio. For example, the higher the SINR, the more complex the modulation scheme and/or coding scheme being used can be, leading to a higher spectral efficiency, and thus throughput. Another factor in the determination of the predicted throughput is how busy the transceiver/base station is. Depending on the amount of traffic caused by other transceivers, only a portion of the (theoretical) throughput determined afore may be available for the mobile transceiver, e.g., as the mobile transceiver may have to share the wireless resources available to the transceiver/base station with other mobile transceivers. For example, the predicted throughput of the wireless communication link may be determined further based on an availability of wireless resources at the transceiver/base station. For example, the theoretical throughput that is predicted based on the SINR may be the theoretical maximum, which may be reduced based on the availability of wireless resources at the transceiver/base station. For example, the available wireless resources may be based on one or more of time resources, frequency resources, coding resources and spatial resources at available at the transceiver/base station.

The method comprises determining 170, based on the predicted throughput of the wireless communication link, the predicted future quality of service of the wireless communication link. The predicted future quality of service may be communicated to the mobile transceiver, or to adapt the quality of content being transmitted over the wireless link by the transceiver/base station. In other words, the method may comprise adapting a current or future communication of the transceiver/base station over the wireless communication link based on the predicted future quality of service of the wireless communication link. Additionally or alternatively, the method may comprise providing 180 information on the predicted future quality of service of the wireless communication link to the mobile transceiver 200.

For example, the predicted future quality of service may define a predicted minimal, average or maximal throughput of the wireless communication link for a point of time or time interval in the future. In other words, information on the predicted future quality of service of the wireless communication link may comprise the information on the predicted throughput of the wireless link, e.g., information on a predicted minimal, average and/or maximal throughput of the wireless link. Additionally, the predicted future quality of service may define a predicted minimal, average or maximal latency of the wireless communication link for a point of time or time interval in the future. In other words, information on the predicted future quality of service of the wireless communication link may comprise the information on the predicted latency of the wireless link, e.g., information on a predicted minimal, average and/or maximal latency of the wireless link.

Figure 2A:
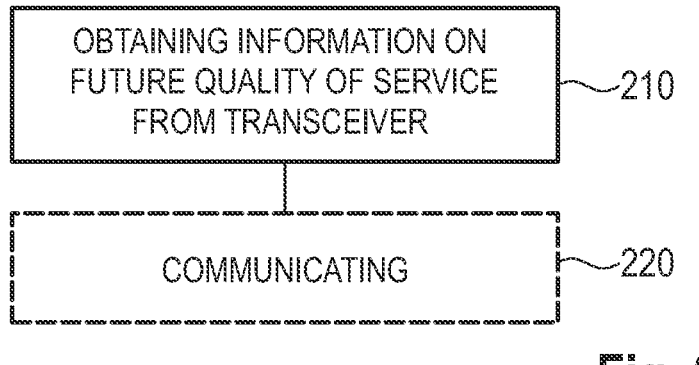
FIG. 2a shows a flow chart of an example of a disclosed method for a mobile transceiver.
Figure 2B:
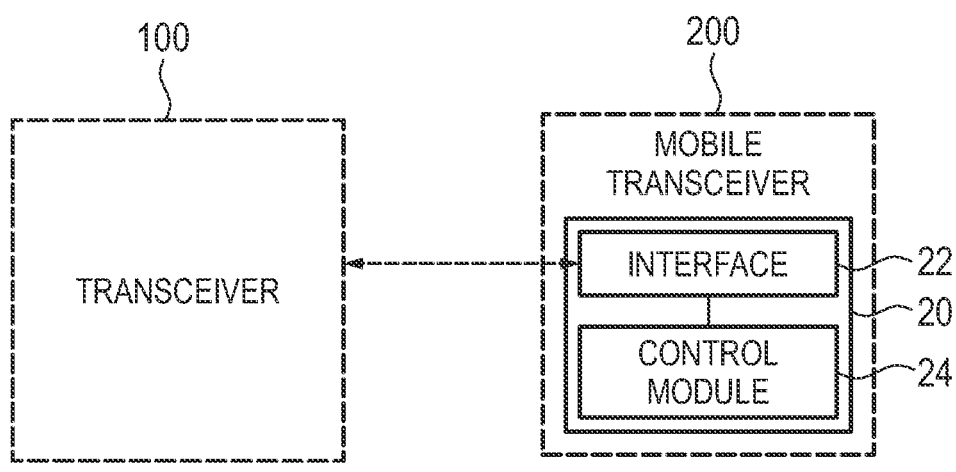
FIG. 2b shows a block diagram of an example of a disclosed apparatus for a mobile transceiver.

The transceiver/base station 100 and the mobile transceiver 200, or the apparatus 10 of FIG. 1c and an apparatus 20 of FIG. 2b may communicate through a mobile communication system. The mobile communication system may, for example, correspond to one of the Third Generation Partnership Project (3GPP)-standardized mobile communication networks, where the term mobile communication system is used synonymously to mobile communication network. The messages (input data, measured data, control information) may hence be communicated through multiple network nodes (e.g., internet, router, switches, etc.) and the mobile communication system, which generates delay or latencies considered in disclosed embodiments.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as the base station 100. A base station can be operable or configured to communicate with one or more active mobile transceivers/vehicles and a base station can be located in or adjacent to a coverage area of another base station, e.g., a macro cell base station or small cell base station. Hence, exemplary embodiments may provide a mobile communication system comprising the mobile transceiver/vehicle 200 and the base station 100, wherein the base stations may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology.

A base station can be located in the fixed or stationary part of the network or system. A base station may be or correspond to a remote radio head, a transmission point, an access point, a macro cell, a small cell, a micro cell, a femto cell, a metro cell etc. A base station can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 200 can be associated with a base station or cell, such as the base station 100. The term cell refers to a coverage area of radio services provided by a base station, e.g., a NodeB (NB), an eNodeB (eNB), a gNodeB, a remote radio head, a transmission point, etc. A base station may operate one or more cells on one or more frequency layers, in some exemplary embodiments a cell may correspond to a sector. For example, sectors can be achieved using sector antennas, which provide a characteristic for covering an angular section around a remote unit or base station. In some exemplary embodiments, a base station may, for example, operate three or six cells covering sectors of 120° (in case of three cells), 60° (in case of six cells) respectively. A base station may operate multiple sectorized antennas. In the following a cell may represent an according base station generating the cell or, likewise, a base station may represent a cell the base station generates.

The apparatus 10 may be comprised in a server, a base station, a NodeB, a relay station, a mobile transceiver, or any service coordinating network entity in disclosed embodiments. It is to be noted that the term network component may comprise multiple sub-components, such as a base station, a server, etc.

In exemplary embodiments the one or more interfaces 12 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 12 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12 may serve the purpose of transmitting or receiving or both, transmitting and receiving, information, such as information, input data, control information, further information messages, etc.

As shown in FIG. 1c the respective one or more interfaces 12 is coupled to the respective control module 14 at the apparatus 10. In disclosed embodiments the control module 14 may be implemented using one or more processing units, one or more processing devices, any method or mechanism for processing, such as a processor, a computer or a programmable hardware component being operable with accordingly adapted software. In other words, the described functions of the control module 14 may as well be implemented in software, which is then executed on one or more programmable hardware components. Such hardware components may comprise a general-purpose processor, a Digital Signal Processor (DSP), a micro-controller, etc. In exemplary embodiments, the one or more interfaces 12 can be configured to wirelessly communicate in the mobile communication system. To do so wireless resources are used, e.g., frequency, time, code, and/or spatial resources, which may be used for wireless communication with a mobile transceiver. The assignment of the wireless resources may be controlled by a base station. Here and in the following wireless resources of the respective components may correspond to any wireless resources conceivable on radio carriers and they may use the same or different granularities on the respective carriers. The wireless resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

More details and features of the transceiver/base station 100, apparatus 10, and corresponding method are mentioned in connection with the proposed concept or one or more examples described above or below (e.g., FIGS. 2a to 3d). The transceiver/base station 100, apparatus 10, and corresponding method may comprise one or more additional optional features corresponding to one or more facets of the proposed concept or one or more examples described above or below.

FIG. 2a shows a flow chart of an example of a method for a mobile transceiver 200. The method comprises receiving 210, from a transceiver 100, such as a base station 100 or further mobile transceiver 100, information on a future quality of service of a wireless communication link between the mobile transceiver and the mobile transceiver. As pointed out in connection with FIG. 1a to 1c, the transceiver 100 is introduced as base station 100. However, alternatively, the transceiver 100 may be a further mobile transceiver 100. The information on the future quality of service of the wireless communication link is based on a predicted received power of the wireless communication link at the mobile transceiver and based on a predicted mismatch between an ideal time-frequency-grid configuration and a time-frequency-grid configuration being used for the wireless communication link.

Figure 2C:
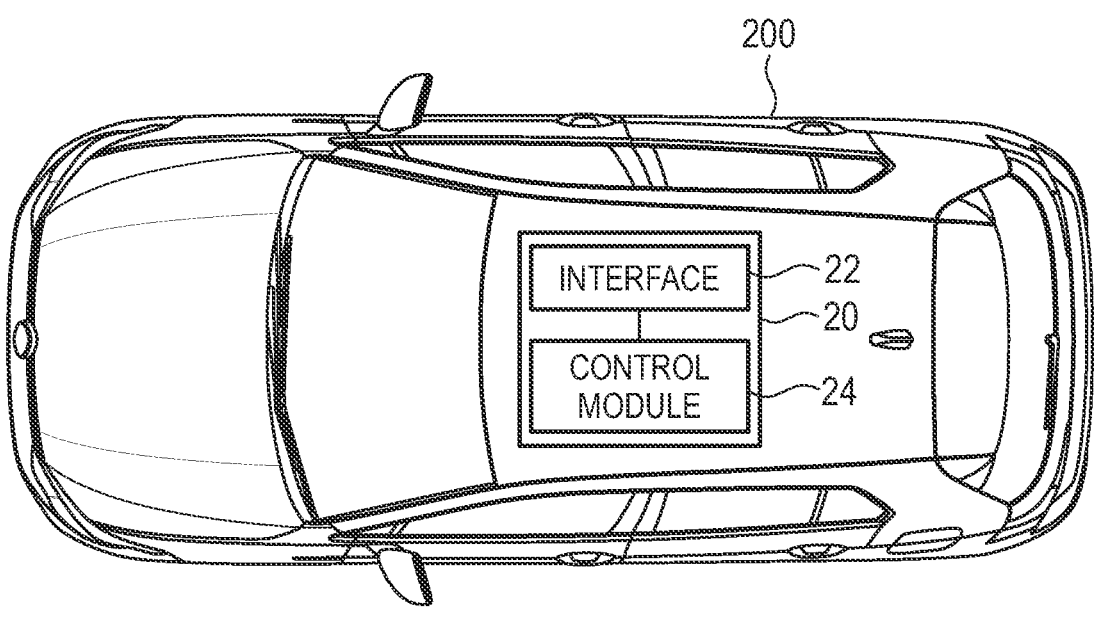
FIG. 2c shows a schematic diagram of a transportation vehicle comprising an apparatus for a mobile transceiver.

FIG. 2b shows a block diagram of examples of a corresponding apparatus 20 for a mobile transceiver. The apparatus 20 comprises one or more interfaces 22 for communicating in a mobile communication system. The apparatus comprises a control module 24 configured to carry out the method introduced in connection with FIG. 2a. For example, the one or more interfaces may be used to communicate with the transceiver/base station 100, and the control module may be used to perform calculations. In general, the functionality of the apparatus 20 is provided by the control module 24, in conjunction with the one or more interfaces 22 with regards to communication. The one or more interfaces 22 are coupled with the control module 24. FIG. 2b further shows the mobile transceiver comprising the apparatus 20. For example, the mobile transceiver may be a mobile device, such as a smartphone, or a transportation vehicle. FIG. 2c shows a transportation vehicle 200 comprising the apparatus 20. FIG. 2b further shows a system comprising the transceiver/base station 100 and the mobile transceiver 200 (with the apparatus 20).

The following description relates to the method of FIG. 2a, to the corresponding apparatus 20 and mobile transceiver 200 of FIG. 2b, and to a corresponding computer program.

The method comprises receiving 210, from the transceiver/base station 100, the information on a future quality of service of a wireless communication link between the mobile transceiver and the mobile transceiver. For example, the information on the future quality of service of the wireless communication link may be implemented as introduced in connection with FIGS. 1a to 1c. In particular, the information on the future quality of service of the wireless communication link is based on the predicted received power of the wireless communication link at the mobile transceiver and based on the predicted mismatch between an ideal time-frequency-grid configuration and a time-frequency-grid configuration being used for the wireless communication link. For example, the information on the future quality of service of the wireless communication link may be based on a predicted throughput of the wireless link, which is predicted based on the predicted received power of the wireless communication link at the mobile transceiver and based on the predicted mismatch between an ideal time-frequency-grid configuration and a time-frequency-grid configuration being used for the wireless communication link. For example, the predicted throughput, and thus the predicted future quality of service, may further be based on one or more of a predicted interference on the wireless communication link, a predicted receiver noise power at the mobile transceiver, a modulation scheme that is selected based on a predicted Signal-to-Interference-and-Noise-Ratio, and an availability of wireless resources at the transceiver/base station.

Based on the predicted future Quality of Service, the result may be used to adjust the communication being performed on the wireless communication link. In other words, the method may comprise communicating 220 on the wireless communication link according to the predicted future Quality of Service, e.g., by adjusting one or more parameters of a content being transmitted over the wireless communication link based on the predicted further quality of service of the wireless communication link. For example, the method may comprise adjusting at least one of a data transmission rate of the content, an amount of redundancy provided within the content, an amount of buffering performed, a size of packets of content etc. Alternatively or additionally, the result may be used to adapt the vehicular application, e.g., by increasing the inter-vehicle distance in a platoon when the future Quality of Service is estimated to drop.

In disclosed embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information, input data, control information, further information messages, etc.

As shown in FIG. 1c the respective one or more interfaces 22 is coupled to the respective control module 24 at the apparatus 20. In exemplary embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc. In disclosed embodiments, the one or more interfaces 22 can be configured to wirelessly communicate in the mobile communication system.

More details and features of the mobile transceiver/vehicle 200, apparatus 20 and corresponding method are mentioned in connection with the proposed concept or one or more examples described above or below (e.g., FIG. 1a to 1c to 3a to 3d). The mobile transceiver/vehicle 200, apparatus 20 and corresponding method may comprise one or more additional optional features corresponding to one or more facets of the proposed concept or one or more examples described above or below.

Various exemplary embodiments relate to a method for advanced performance prediction in multicarrier transmission systems.

Future vehicular communication systems require high reliability and efficiency under various mobility conditions.

Communication systems are irregular in their performance, but the quality of the communication may be predicted. A well-known approach is to predict the throughput based on radio maps. Such radio maps are also called coverage maps. The throughput is predicted based on the estimated received power. However, the performance degradation due to grid mismatch is not taking into account.

In addition to the received power, the configuration of the pulses and grid has a significant impact on the bit error rate (BER). The grid of a multicarrier system is defined by the length of the time shifts T and frequency shifts F; in other words, T and F are the lengths of one time symbol and subcarrier spacing, respectively. In the case of 5G NR (5$^{th}$ generation mobile communication system New Radio, rectangular pulses are used to obtain the waveform from the time-frequency domain in the time domain. Such a transformation may be implemented by a simple Fourier transform or Gabor filter bank.

However, this exemplary embodiment has not been considered for throughput prediction so far. 5G NR offers multiple configuration options such as mini slots and scalable subcarrier spacing (SCS). FIG. 3a shows examples of (distinct) configurations for 5G NR. For example, one sub-frame may have a duration of 1 ms. At 15 kHz, the sub-frame may comprise one slot with 14 symbols. At 30 kHz, the sub-frame may comprise two slots with 14 symbols each. At 60 kHz, the sub-frame may comprise four slots with 14 symbols each. At 120 kHz, the sub-frame may comprise eight slots with 14 symbols each.

It is desirable to configure the grid so that it matches the channel characteristics, i.e., the delay and Doppler spread. The following formulae and FIG. 3b, taken from P. Jung and G. Wunder, "WSSUS pulse design problem in multicarrier transmission" depicts how the grid and pulses should match the channel realization from a theoretical view-point to obtain high performance. The formulae and FIG. 3b, which illustrates $$\frac{\tau_{max}}{2v_{max}}$$

give multi-carrier Gabor pulse designing rules for an efficient communication based on the channel delay and Doppler shifts.

$$1 < const. = TF; \; \frac{T}{F} = \frac{\sigma_t}{\sigma_f} := \frac{\tau_{max}}{2v_{max}}$$

One or more actions of the following method may be executed at a transceiver/base station:

A coverage map may be used to estimate the received power (P).

The experienced grid mismatch caused by the delay and Doppler spread may be predicted, depending on the speed of the user equipment (UE, also mobile transceiver) and delay data base based on the location and path of the UE to determine $P_{grid \; mismatch}$. This grid mismatch depends on the grid configuration: subcarrier spacing and time symbol length which is configurable for 5G NR (see FIG. 3a).

The interference caused by other BSs and UEs may be predicted ($P_{interference}$), this may be done by using the position and future path of the UEs as well as the configuration of the transmissions between them (frequency, grid etc.).

The receiver noise power $\sigma^2$ may be predicted, depending on the bandwidth B.

The results of one or more of the previous predictions may be used to predict the Signal-to-Interference-and-Noise-Ratio (SINR), e.g., using the following formula:

$$SINR = \frac{P}{\sigma^2 + P_{orid\,mismatch} + P_{interference}}.$$

Furthermore, which waveform is being used may be taken into account, i.e., OFDM (Orthogonal Frequency-Division Multiplexing), OTFS (Orthogonal Time Frequency Space) etc., which may lead to distinct BER performance.

The possible throughput may be predicted, which is linked to the spectral efficiency, with the SINR being based on the configuration of the mobile communication system (MCS). FIG. 3c shows a graph illustrating the spectral efficiency at different SINR, with the SINR in dB on the x-axis and the spectral efficiency in bits/s/Hz. As can be seen from FIG. 3c, the higher the SINR, the more complex the modulation scheme/coding may become, leading to a higher spectral efficiency. FIG. 3c shows sub-graphs for modulations QPSK (Quadrature Phase-Shift Keying) 310, 16QAM Quadrature Amplitude Modulation) 320 and 64QAM, and the theoretical Shannon limit 340.

Furthermore, the resource allocation of the corresponding cell may be taken into account, i.e., How many resources may be available for one UE?

Figure 3D:
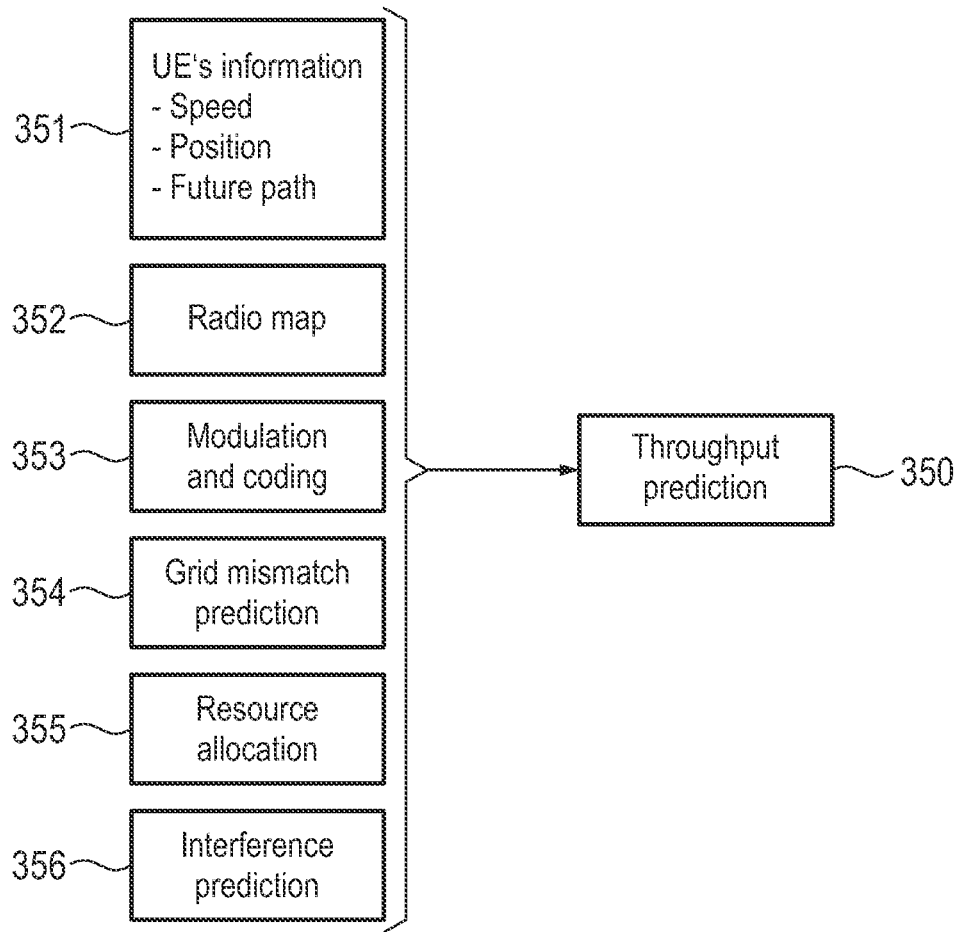
FIG. 3d shows possible inputs for the proposed throughput prediction.

FIG. 3d shows possible inputs for the proposed throughput prediction. For example, the throughput 350 may be predicted based on one or more of the UE's information 351 (speed, position, future path), a radio map 352, modulation and coding 353, grid mismatch prediction 354, resource allocation 355 and interference prediction 356.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

REFERENCE LIST

10 Apparatus
12 Interface
14 Control module
20 Apparatus
22 Interface

19

24 Control module
100 Transceiver/base station
110 Obtaining information on position and movement
120 Determining predicted received power
130 Determining predicted grid mismatch
140 Determining predicted interference
150 Determining predicted receiver noise power
160 Determining predicted throughput
170 Determining future quality of service
180 Providing information on future quality of service to mobile transceiver
200 Mobile transceiver, transportation vehicle
210 Obtaining information on future quality of service from transceiver/base station
220 Communicating
310 QPSK
320 16QAM
330 64QAM
340 Shannon limit
350 Predicted throughput
351 UE's information
352 Radio map
353 Modulation and coding
354 Grid mismatch prediction
355 Resource allocation
356 Interference prediction

The invention claimed is:

1. A method for predicting a future quality of service of a wireless communication link between a base station and a mobile transceiver, the method comprising:
   obtaining information on a position and information on a relative movement of the mobile transceiver relative to the base station;
   determining a predicted received power of the wireless communication link at the mobile transceiver based on the position of the mobile transceiver;
   determining a predicted mismatch between an ideal time-frequency-grid configuration and a time-frequency-grid configuration used for the wireless communication link based on the position and relative movement of the mobile transceiver relative to the base station;
   determining a predicted throughput of the wireless communication link based on the predicted received power and based on the predicted mismatch between the ideal time-frequency-grid configuration and the time-frequency-grid configuration used for the wireless communication link;
   determining the predicted future quality of service of the wireless communication link based on the predicted throughput of the wireless communication link; and
   providing information on the predicted future quality of service of the wireless communication link to the mobile transceiver.

2. The method of claim 1, wherein the predicted mismatch between the ideal time-frequency-grid configuration and the time-frequency-grid configuration used for the wireless communication link is based on a predicted delay-Doppler spread of the wireless communication link.

3. The method of claim 2, wherein a Doppler-component of the predicted delay-Doppler spread is based on a relative velocity of the relative movement of the mobile transceiver relative to the base station, and/or wherein a delay-component of the predicted delay-Doppler spread is based on the position of the mobile transceiver.

4. The method of claim 2, wherein at least one of a Doppler-component and a delay-component of the delay-Doppler spread is determined by retrieving the respective information from a database based on the relative movement and/or position of the mobile transceiver relative to the base station.

5. The method of claim 1, wherein the predicted received power of the wireless communication link at the mobile transceiver is determined based on a coverage map of a radio environment of the base station.

6. The method of claim 1, further comprising determining a predicted interference on the wireless communication link, wherein the predicted throughput of the wireless communication link is determined further based on the predicted interference on the wireless communication link.

7. The method of claim 1, further comprising determining a predicted receiver noise power at the mobile transceiver, wherein the predicted throughput of the wireless communication link is determined further based on the predicted receiver noise power at the mobile transceiver.

8. The method of claim 1, wherein the predicted throughput of the wireless communication link is determined based on a predicted Signal-to-Interference-and-Noise-Ratio based on the predicted received power, based on the predicted mismatch between the ideal time-frequency-grid configuration and the time-frequency-grid configuration used for the wireless communication link, based on a predicted interference on the wireless communication link and based on a predicted receiver noise power at the mobile transceiver.

9. The method of claim 8, wherein the predicted throughput of the wireless communication link is determined based on a modulation scheme that is selected based on the predicted Signal-to-Interference-and-Noise-Ratio.

10. The method of claim 1, wherein the predicted throughput of the wireless communication link is determined further based on an availability of wireless resources at the base station.

11. The method of claim 1, wherein the wireless communication link is based on a multicarrier transmission-based wireless communication system, and/or
   wherein the wireless communication link is based on one of an Orthogonal Frequency Division Multiplexing-based wireless communication system, an Orthogonal Time-Frequency-Space-based wireless communication system, and a Filter-Bank Multi Carrier-based wireless communication system, and/or
   wherein the predicted throughput of the wireless communication link is determined based on a multicarrier transmission-based wireless communication system being used for the wireless communication link.

12. A non-transitory computer readable medium including a computer program having program code for performing the method of claim 1, when the computer program is executed on a computer, a processor, or a programmable hardware component.

13. An apparatus comprising:
   one or more interfaces for communicating in a mobile communication system; and
   a control module configured to predicting a future quality of service of a wireless communication link between a transceiver and a mobile transceiver by:
      obtaining information on a position and information on a relative movement of the mobile transceiver relative to the base station;
      determining a predicted received power of the wireless communication link at the mobile transceiver based on the position of the mobile transceiver;
      determining a predicted mismatch between an ideal time-frequency-grid configuration and a time-frequency-grid configuration used for the wireless communication link based on the position and relative movement of the mobile transceiver relative to the base station;

determining a predicted throughput of the wireless communication link based on the predicted received power and based on the predicted mismatch between the ideal time-frequency-grid configuration and the time-frequency-grid configuration used for the wireless communication link;

determining the predicted future quality of service of the wireless communication link based on the predicted throughput of the wireless communication link; and providing the information on the predicted future quality of service of the wireless communication link to the mobile transceiver.

14. The method of claim 1, further comprising using the predicted quality of service of the wireless communication link between the base station and the mobile transceiver to adapt current or future communication over the wireless communication link, wherein adaptation includes communicating the predicted future quality of service to the mobile transceiver, and/or adapting a quality of content being transmitted currently transmitted or transmitted in the future over the wireless communication link by the mobile transceiver and/or the base station.

15. The apparatus of claim 13, wherein the predicted mismatch between the ideal time-frequency-grid configuration and the time-frequency-grid configuration used for the wireless communication link is based on a predicted delay-Doppler spread of the wireless communication link.

16. The apparatus of claim 15, wherein a Doppler-component of the predicted delay-Doppler spread is based on a relative velocity of the relative movement of the mobile transceiver relative to the base station, and/or wherein a delay-component of the predicted delay-Doppler spread is based on the position of the mobile transceiver.

17. The apparatus of claim 15, wherein at least one of a Doppler-component and a delay-component of the delay-Doppler spread is determined by retrieving the respective information from a database based on the relative movement and/or position of the mobile transceiver relative to the base station.

18. The apparatus of claim 13, wherein the predicted received power of the wireless communication link at the mobile transceiver is determined based on a coverage map of a radio environment of the base station.

19. The apparatus of claim 13, wherein the control unit determines a predicted interference on the wireless communication link, wherein the predicted throughput of the wireless communication link is determined further based on the predicted interference on the wireless communication link.

20. The apparatus of claim 13, wherein the control unit determines a predicted receiver noise power at the mobile transceiver, wherein the predicted throughput of the wireless communication link is determined further based on the predicted receiver noise power at the mobile transceiver.

21. The apparatus of claim 13, wherein the predicted throughput of the wireless communication link is determined based on a predicted Signal-to-Interference-and-Noise-Ratio based on the predicted received power, based on the predicted mismatch between the ideal time-frequency-grid configuration and the time-frequency-grid configuration used for the wireless communication link, based on a predicted interference on the wireless communication link, and based on a predicted receiver noise power at the mobile transceiver.

22. The apparatus of claim 21, wherein the predicted throughput of the wireless communication link is determined based on a modulation scheme that is selected based on the predicted Signal-to-Interference-and-Noise-Ratio.

23. The apparatus of claim 13, wherein the predicted throughput of the wireless communication link is determined further based on an availability of wireless resources at the base station.

24. The apparatus of claim 13, wherein the wireless communication link is based on a multicarrier transmission-based wireless communication system, and/or wherein the wireless communication link is based on one of an Orthogonal Frequency Division Multiplexing-based wireless communication system, an Orthogonal Time-Frequency-Space-based wireless communication system, and a Filter-Bank Multi Carrier-based wireless communication system, and/or wherein the predicted throughput of the wireless communication link is determined based on a multicarrier transmission-based wireless communication system being used for the wireless communication link.

* * * * *